Dec. 2, 1969          W. A. HARTLERODE, JR          3,481,654
TRACK CONSTRUCTION FOR A TRACK-LAYING VEHICLE
Filed Nov. 13, 1967
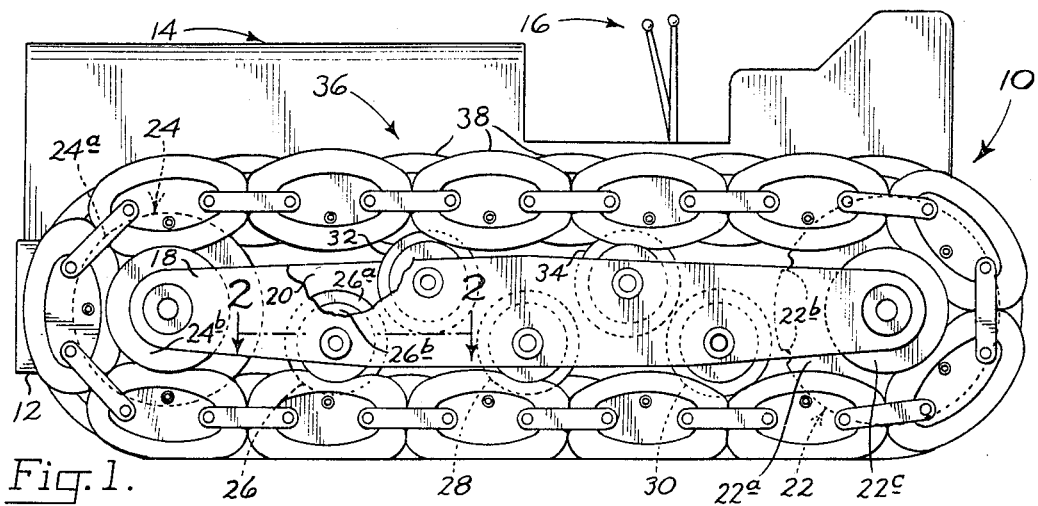
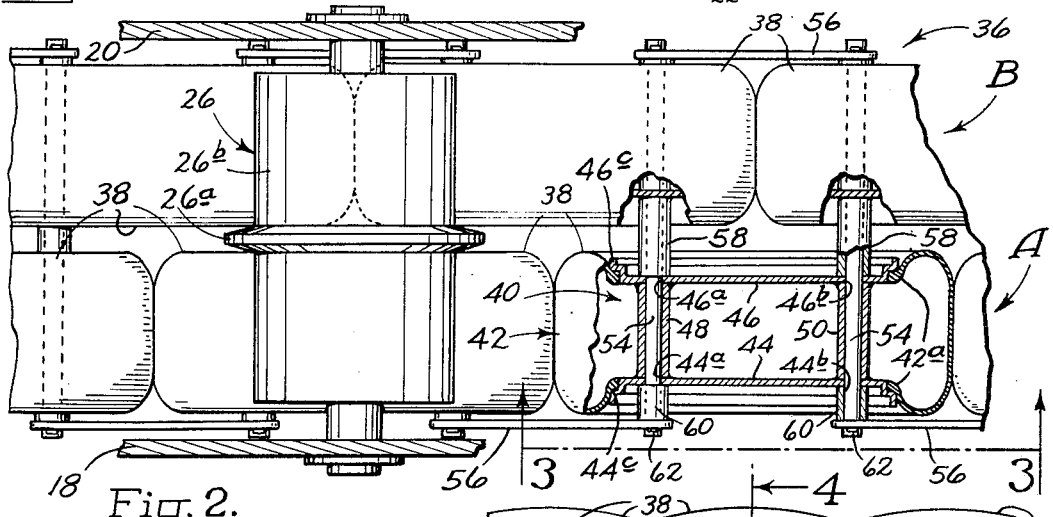
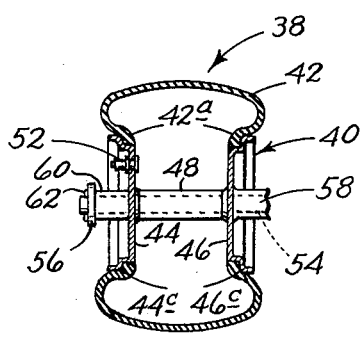
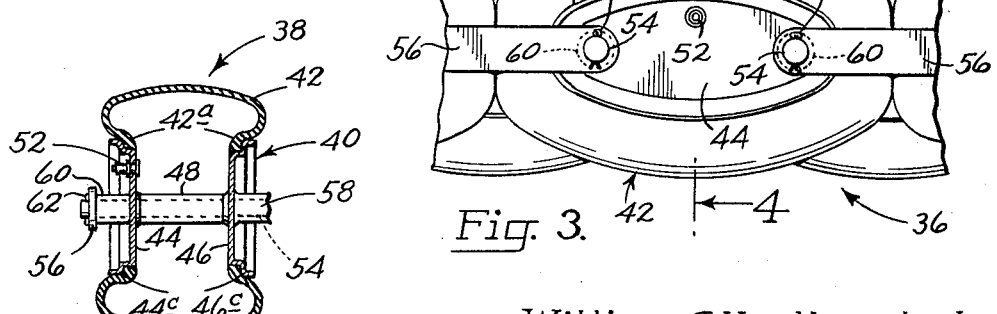
William A. Hartlerode, Jr.
INVENTOR
BY
Rolisch + Hartwell
Attys.

United States Patent Office 3,481,654
Patented Dec. 2, 1969

3,481,654
TRACK CONSTRUCTION FOR A TRACK-LAYING VEHICLE
William A. Hartlerode, Jr., Rte. 1, Box 600,
Eagle Point, Oreg. 97524
Filed Nov. 13, 1967, Ser. No. 682,106
Int. Cl. B62d 55/20
U.S. Cl. 305—34                                             8 Claims

ABSTRACT OF THE DISCLOSURE

An endless track for use in a track-laying vehicle including plural pad assemblies, each having a rigid hub and an inflated, deformable, tire-like element mounted on the hub for engaging the ground. The pad assemblies are disposed in a pair of spaced rows defining a pair of parallel endless courses, with the assemblies in each row staggered relative to the assemblies in the other row. Interconnecting the assemblies for relative pivotal movement about parallel axes which are normal to the longitudinal axes of the courses are elongated pivot pins that extend between the rows through hubs in adjacent assemblies, and links pivotally interconnecting adjacent sets of ends of the pins. In each row, the inflated elements in adjacent pad assemblies press firmly against one another regardless of the angular dispositions of the assemblies.

---

This invention relates to track-laying vehicles, and more particularly, to endless track construction for use in such a vehicle.

Very often it is desirable to use a track-laying vehicle on relatively soft ground such as mud or snow. However, it is known from past experience with vehicles of this type that travel over such ground is difficult, and that there are a number of problems which must be solved if a vehicle is to perform satisfactorily. In particular, since it is the tracks of such a vehicle that support it for movement on the ground, several important factors regarding track construction should be considered.

To begin with, and to minimize the chance of a vehicle sinking into soft ground and becoming stuck, a track for the vehicle should be designed to produce minimal cutting of the ground with movement of the vehicle. Thus, the track should not have hard sharp edges which work against the ground. In addition, the track should offer a relatively large ground-engaging support area to provide low pressure contact with the ground. Also, the track should be as light in weight as possible.

Another factor to consider is the severe stressing and damage which can result from the build-up of large amounts of snow or mud on the relatively moving parts in a track. Accordingly, a track should be designed to minimize the possibility of a large build-up of such material.

A general object of the present invention, therefore, is to provide, for use in a track-laying vehicle, a novel track construction which takes the above-mentioned factors into account in a practical and satisfactory manner, and which facilitates travel of the vehicle over soft ground.

More particularly, an object of the invention is to provide a track which affords relatively low-pressure, non-cutting, yieldable contact with the ground. Thus, and according to the invention, the track features plural pad assemblies disposed in a pair of spaced rows which define a pair of parallel endless courses. Each pad assembly includes a rigid hub and an inflated, deformable, tire-like element mounted on the hub. The inflated elements are oblong, and each element offers a relatively large surface area for yieldable contact with the ground. In addition, such elements have no sharp edges to cut into the ground.

Another object of the invention is to provide such a track construction wherein the relatively movable parts of the track resist a build-up thereon of ground particles, such as particles of mud or snow, which might cause severe stressing in the track.

To accomplish this object, the pad assemblies in each row of the track are interconnected with their inflated elements pressing firmly against one another. More specifically, the assemblies are connected through novel spaced pivot connections provided on each hub, and links pivotably connecting adjacent pivot connections in adjacent assemblies. With the inflated elements thus engaging one another, the chance of large amounts of foreign matter building up between a pair of assemblies is greatly minimized. Any small amount of mud or snow or the like which does collect, results in negligible stressing in the track since the inflated elements are deformable. In addition, the novel links and pivot connections for the assemblies limit the relative pivotal movement permitted between adjacent assemblies, and thus prevent the assemblies from rolling, with their inflated elements thereby carrying foreign matter between the assemblies..

A further object is to provide such a track wherein the pad assemblies in each row are staggered relative to the assemblies in the other row. Such an organization in particularly advantageous in providing good support for a vehicle travelling over rough terrain where abrupt changes in ground elevation may occur.

Yet another object of the invention is to provide a track construction of the type so far indicated which, while large enough to provide a large ground-engaging area for supporting a vehicle, is relatively light in weight.

These and other objects and advantages attained by the invention will become more fully apparent as the description which follows is read in conjunction with the accompanying drawings, wherein:

FIG. 1 is a side elevation of a tractor employing track assemblies (only one of which is visible in the figure) constructed according to the invention;

FIG. 2 is an enlarged cross-sectional view taken along the line 2—2 in FIG. 1 illustrating portions of a track assembly employed on the tractor of FIG. 1;

FIG. 3 is a fragmentary side elevation taken along the line 3—3 in FIG. 2; and

FIG. 4 is a fragmentary cross-sectional view taken along the line 4—4 in FIG. 3.

Turning now to the drawings and considering first FIG. 1, indicated generally at 10 is a track-laying vehicle taking the form of a crawler tractor. The tractor includes a frame 12, an engine 14 mounted adjacent the front of the frame, and an operator's station 16 adjacent the rear of the frame. Suitably mounted on and extending along frame 12 on opposite sides of the tractor are pairs of elongated laterally spaced support members, such as members 18, 20.

Journaled on and extending between the right ends of members 18, 20 in FIG. 1 for rotation about an axis extending transversely of frame 12 is a sprocket wheel 22. Describing the construction of this wheel, and referring to FIG. 1, centrally between its axially opposite ends wheel 22 includes a relatively thin (in an axial direction) radially projecting sprocket part 22a having notches, such as notches 22b distributed circumferentially about the periphery of part 22a. Joined to and projecting axially away from opposite sides of part 22a are a pair of drum parts, such as part 22c. Parts 22c have a considerably smaller outside diameter than part 22a, but have a considerably greater axial dimension. The outer ends of drum parts 22c are located closely adjacent members 18, 20. A suitable driving connection (not shown) is established between engine 14 and wheel 22.

Similarly journaled on and extending between members 18, 20 adjacent their left ends in FIG. 1 is a forward idler wheel 24 which is somewhat similar in construction to wheel 22. Wheel 24 includes a relatively thin, central, radially projecting part 24a, and a pair of drum parts, such as part 24b extending axially away from opposite sides of parts 24a. Part 24a in wheel 24 has substantially the same axial dimension as sprocket part 22a, but has a somewhat smaller outside diameter. Also, part 24a has no notches in its periphery. Drum parts 24b have substantially the same dimensions as drum part 22c.

Also journaled on and extending between members 18, 20 in the region between wheels 22, 24 is a set of lower idler wheels 26, 28, 30, and a set of upper idler wheels 32, 34. The lower and upper idler wheels are substantially the same in construction, and are similar in many respects to wheel 24. Thus, and considering wheel 26, it includes a radially extending central part 26a corresponding to part 24a, and a pair of drum parts, such as part 26b, corresponding to part 24b. Parts 26a, 26b have substantially the same axial dimensions as parts 24a, 26b, respectively, but as can be seen, have considerably smaller diametral dimensions.

Similar sprocket and idler wheels are journaled on the support members on the other side of the tractor frame corresponding to members 18, 20.

Trained over the idler and sprocket wheels along each side of frame 12, in a manner which will be more fully explained, is an endless track, such as track 36, constructed according to the invention, and supporting the tractor for movement over the ground. Generally describing track 36, the two tracks for tractor 10 being substantially the same in construction, the track comprises plural pad assemblies 38. The pad assemblies are disposed in a pair of rows, indicated generally at A, B in FIG. 2 which define what are referred to herein as parallel endless courses. As can be seen clearly in FIGS. 2 and 3, the pad assemblies in row A are staggered with respect to those in row B, and overlap one another.

Referring particularly to FIGS. 2 through 4, and considering in detail the construction of a pad assembly, each assembly includes a rigid hub, such as hub 40, and an inflated element, such as element 42 mounted on the hub. Hub 40 comprises a pair of laterally spaced, somewhat ovate-shaped side parts 44, 46. Sides parts 44, 46 include pairs of spaced bores 44a, 44b and 46a, 46b, respectively, and outwardly projecting circumferential rims 44c, 46c, respectively, having the configurations shown. The spacing between bores 44a, 44b is substantially the same as the spacing between bores 46a, 46b. The side parts are joined together, with bores 44a, 46a and 44b, 46b axially aligned with one another, by means of a pair of elongated tubes 48, 50 which extend between the side parts. Tube 48 is positioned so that its hollow interior is aligned axially with bores 44a, 46a, and similarly, tube 50 is positioned with its hollow interior aligned with bores 44b, 46b. The tubes are joined to the side parts in any suitable manner, as by welding, to form an airtight joint between the tubes and side parts.

Considering particularly FIGS. 3 and 4, suitably mounted on side part 44 is a valve 52 similar in construction to the conventional valve provided in the wheel of an automobile. Valve 52 accommodates gas flow to inflate and deflate element 42 mounted on hub 40.

Element 42, preferably is made of a deformable material similar to that used in the usual automobile tire, and has an ovate-shaped side outline, as can be seen clearly in FIG. 3. The cross-sectional configuration of element 42, illustrated in FIGS. 2 and 4, is somewhat C-shaped. Also, as can be seen in FIGS. 2 and 3, element 42 includes a pair of inner circumferential marginal parts 42a which are shaped to form a substantially air tight fit with rims 44c, 46c in the hub.

The various pad assemblies in the track are pivotally interconnected through elongated pivot pins, such as pins 54, and elongated links, or link means, such as links 56. The pivot pins extend between the pad assemblies in rows A, B in the manner shown, with the pins extending through aligned tubes and bores in the hubs of adjacent pad assemblies. The pad assemblies in row A are spaced apart from those in row B by means of sleeves 58 freely mounted on pins 54 centrally between opposite ends of the pins.

The opposite ends of pins 54 project laterally outwardly of the pad assemblies, and links 56 pivotally interconnect adjacent pairs of such ends of the pins. The links are sized so that the pins, when interconnected in the track, are spaced equally about the track. The links are held away from the sides of the pad assemblies by means of sleeves 60 mounted on the outer sets of ends of pins 54, and are held in place on the pins by means of cotter pins 62.

As can be seen in FIGS. 1 through 3, with the pad assemblies interconnected in the manner shown, the inflated elements in adjacent pad assemblies in each row press firmly against one another.

With track 36 mounted in the manner shown in FIG. 1, The pad assemblies in spaced rows A, B ride upon and are supported by the axially spaced drum parts of sprocket wheel 22 and of idler wheels 24, 26, 28, 30, 32, 34. Sprocket part 22a extends into the space between the rows, with notches 22b receiving and drivingly engaging sleeves 58. The radially projecting central parts of the idler wheels also extend into the space between rows A, B, but do not engage sleeves 58. These projecting central parts of the idler wheels function to hold the track in place against lateral shifting.

The other track (not shown) in the assembly, provided on the other side of the tractor, is similarly supported and driven.

Considering various advantages offered by the track construction described herein, it will be noted that the inflated elements present a relatively large ground-engaging area, and thus provide low pressure contact with the ground which is desirable when traveling over soft terrain. In this regard, it will be noted further that the inflated elements engaging the ground at any particular moment are compressed and deformed somewhat, and this tends to maximize the ground-engaging area.

Because the inflated elements are deformable, and are formed with rounded outside contours, cutting of the ground is minimized.

With the inflated elements in each row of pad assemblies squeezing against one another, and because of the novel pin and link connections provided between the assemblies which permit only limited relative pivotal movement of the assemblies, the chance for foreign matter such as mud or snow to build up and cause undue stressing in the track is greatly minimized.

The overlapping organization of the pad assemblies provides an additional advantage. With such construction, a ground-engaging surface exists at substantially all points along the length of a vehicle, and there is no loss of support for the vehicle when it travels over objects such as stones and logs, or over terrain where there are abrupt changes in ground elevation.

A further advantage is that because each inflated element is mounted on a separate hub and is independently inflatable, should a puncture occur causing one element to deflate, the whole track will not collapse. In addition, a track constructed according to the invention is relatively light in weight, and thus does not appreciably add to the weight acting upon the ground.

Obviously, to suit different purposes, the pad assemblies may be sized accordingly. Also, the amount of inflation of the inflated elements in the assemblies is a matter of choice. Thus, while a preferred embodiment of the invention has been described herein, it is appreciated that variations and modifications may be made without departing from the spirit of the invention. Accordingly, it is desired to cover all such variations and modifications which would be apparent to those skilled in the art, and that come within the scope of the appended claims.

It is claimed and desired to secure by Letters Patent:

1. An endless track for use in a track-laying vehicle comprising a first and a second series of pad assemblies, with the assemblies in each series disposed in a row to form an endless course, with the course of said first series spaced to one side of and substantially paralleling the course of said second series, and with each pad assembly in each series including a rigid hub and a ground-engaging, deformable, inflated element mounted on the hub, in each series, a pair of pivot connections on each hub spaced along the length of the course formed by the series, and link means distributed along the course interconnecting adjacent pivot connections in adjacent pad assemblies accommodating relative pivotal movement between such assemblies, and connecting means operatively connecting the assemblies in said first series to those in said second series with the assemblies in the first series, as viewed from a side of the track, overlapping the assemblies in the second series.

2. The track of claim 1, wherein considering each pair of adjacent pad assemblies in a series, and regardless of the relative angular dispositions of the assemblies, the inflated elements therein include portions that engage and press firmly against one another.

3. The track of claim 1, wherein said connecting means comprises plural elongated pivot pins, each pivotally mounted on and extending between the hub of a pad assembly in said first series and the hub of an adjacent pad assembly in said second series, and a spacer member mounted on each pin spacing the hubs of the pad assemblies which the pin interconnects.

4. The track of claim 3, wherein said pivot pins are evenly spaced along the lengths of said courses.

5. The track of claim 3, wherein each hub of a pad assembly pivotally mounts a pair of said pivot pins with the pins having ends projecting laterally outwardly of the hub, and the spaced pivot connections provided on each hub for connection with said links are formed by said ends of said pair of pivot pins.

6. The track of claim 5, wherein each hub comprises a pair of laterally spaced, parallel, ovate-shaped side parts each including a pair of spaced bores aligned with a similar pair of bores in the other side part, and a pair of elongated tubes extending between and joining the side parts, with the hollow interior in each tube communicating with a pair of aligned bores, and, together with such bores, freely receiving one of said pivot pins.

7. The track of claim 6, wherein considering each hub one side part therein includes a valve accommodating gas flow to inflate and deflate the element mounted on the hub.

8. The track of claim 6, wherein each inflated element has an ovate-shaped, tire-like configuration.

References Cited
UNITED STATES PATENTS

| | | | |
|---|---|---|---|
| 2,254,787 | 9/1941 | Aukland | 305—34 |
| 2,306,577 | 12/1942 | Walker | 305—34 |
| 2,463,121 | 3/1949 | Sapp | 305—34 X |
| 2,867,480 | 1/1959 | Cushman | 305—34 X |
| 2,916,006 | 12/1959 | Crandall | 115—1 |
| 3,146,035 | 8/1964 | Bonmartini | 305—34 X |
| 3,170,533 | 2/1965 | Fewel | 305—34 X |
| 3,223,462 | 12/1965 | Dalrymple | 305—34 |

RICHARD J. JOHNSON, Primary Examiner